May 30, 1961 W. H. DU BOIS 2,986,252
MOUNTING FOR FRICTION LINING SEGMENTS
Filed Oct. 2, 1957 2 Sheets-Sheet 1

INVENTOR.
WILLIAM H. DuBois
BY John A. Young
ATTORNEY

May 30, 1961  W. H. DU BOIS  2,986,252
MOUNTING FOR FRICTION LINING SEGMENTS
Filed Oct. 2, 1957  2 Sheets-Sheet 2
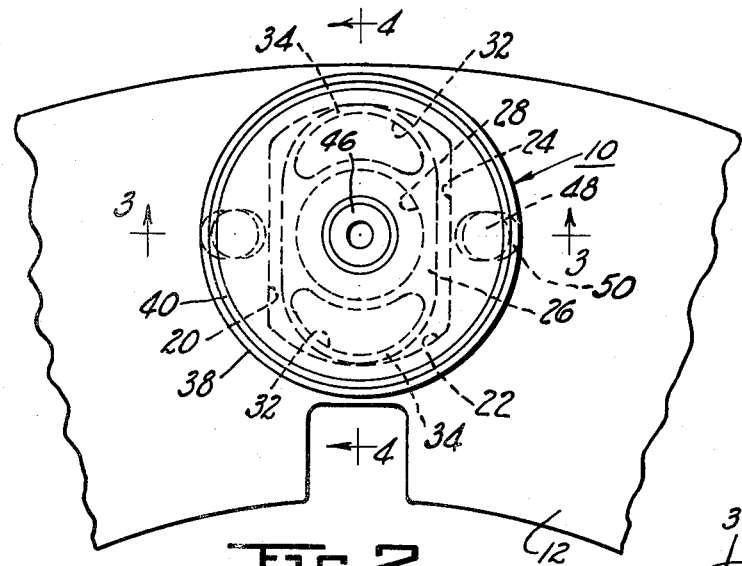
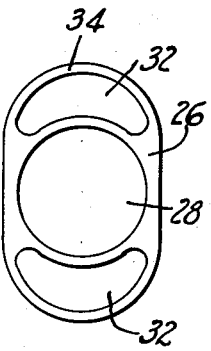
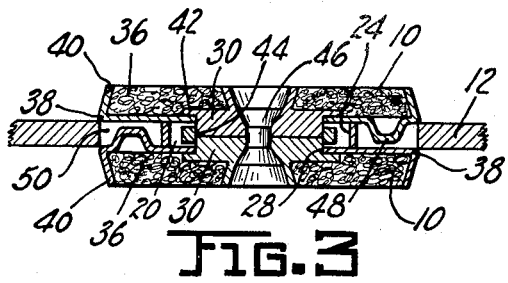
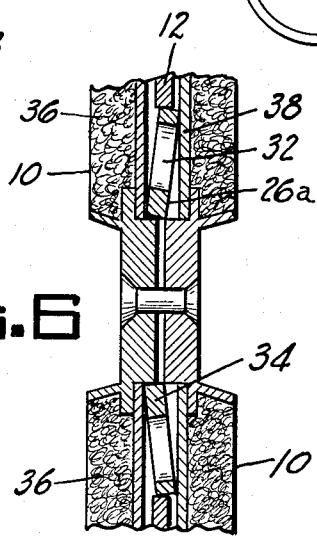
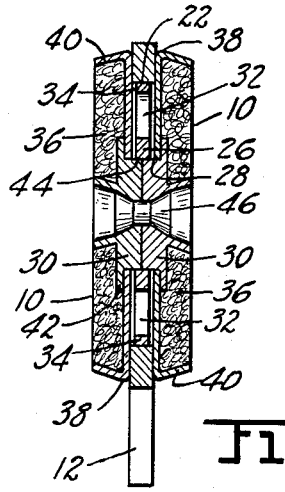
INVENTOR.
WILLIAM H. DU BOIS
BY John A. Young
ATTORNEY

United States Patent Office 2,986,252
Patented May 30, 1961

2,986,252
MOUNTING FOR FRICTION LINING SEGMENTS
William H. Du Bois, South Bend, Ind., assignor to The Bendix Corporation, a corporation of Delaware
Filed Oct. 2, 1957, Ser. No. 687,733
10 Claims. (Cl. 192—107)

This invention relates to mounting structures for segments of friction material lining which are used in clutch devices, brakes and the like.

It has been found that inorganic friction lining materials possess many advantages over organic friction lining materials, and particularly in such respects as greater wear life and higher effectiveness. The inorganic friction materials which have been most successful are the metallic-ceramic combinations which embody a great number of performance advantages. These materials do lack resilience, however, and some are therefore prone to chatter during brake or clutch operation unless resilience is provided in the mounting therefor. The brake or clutch chatter is a phenomena sometimes referred to as the "slip-stick" characteristic of the lining during which the opposing surfaces of the friction material and its mating surface tend to grab and release alternately.

Much research has been undertaken to determine the causes of chatter because it is a major limitation of the inorganic friction material.

It has been found that whenever the coefficient of friction of the friction material increases unduly approaching zero slip velocity, the friction material will tend to develop chatter in operation. Other evidence tends to establish that brake chatter is a matter of frequency of torque variations developed by the brake and that chatter becomes most destructive when it reaches a harmonic frequency, with respect to its mounting structure—viz., strut, etc.

It is proposed that modulating the frequencies of the brake chatter will damp harmonic vibration and in this manner chatter can be avoided or at least suppressed. This invention proposes a mechanical solution to the difficulty of brake chatter in which the mounting structure for the friction segments will damp harmonic frequencies which develop during operation and thus serve to suppress brake chatter.

It is an object of the present invention to construct a cushion mounting for segments of friction material which are used in brakes, clutches and the like, this cushion mounting providing a variable cushioning effect for the various segments in order that harmonic frequencies which arise during use are effectively damped to prevent chatter. Another object of the invention is to adapt the described cushion mounting for high kinetic energy absorbing brakes, it being required of this mounting to withstand high braking temperatures, without loss in cushioning function.

It is further proposed with the present invention to provide a resilient mounting for segments of friction material, which mounting permits both axial and circumferential floating movement of the friction segment. Through such an arrangement, no one of the segments will absorb a disproportionate amount of the braking load and thus all of the segments will remain substantially equal in their frictional contribution. This is important since the friction segments sometimes change in their frictional value with use.

Other objects and features of the invention will become apparent from a consideration of the following description which proceeds with reference to the accompanying drawings, wherein:

Figure 2 is an enlarged side view of one of the friction segments with only a part of the stator being shown;

Figure 3 is a section view taken on line 3—3 of Figure 2;

Figure 4 is a section view taken on the indicated reference line in Figure 2;

Figure 5 is a view showing the detail of the connecting member; and

Figure 6 is a second embodiment of the invention showing how the friction segments can be permitted to move axially as well as circumferentially.

Figure 1:
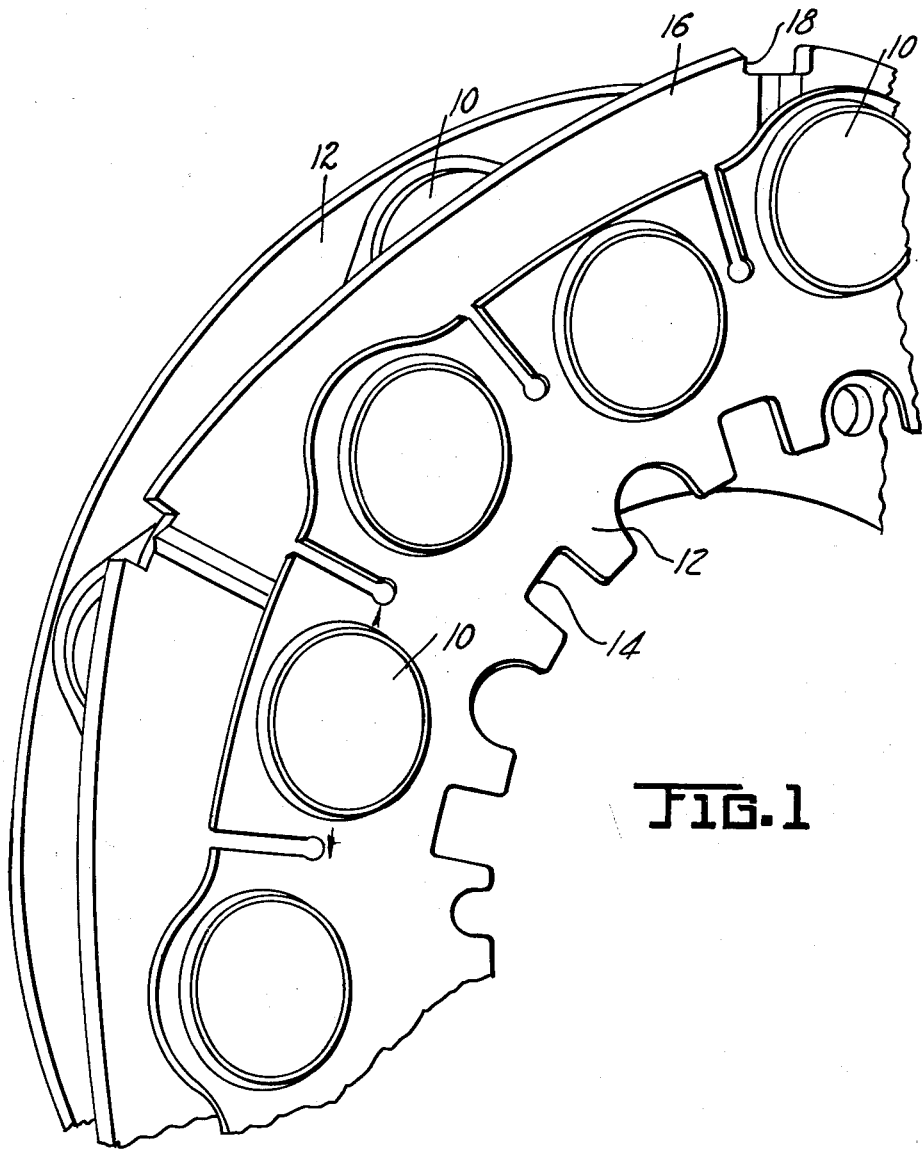
Figure 1 is a fragmentary isometric view of a disk type brake or clutch showing the interleaved rotors and stators.

The invention can be used for both brakes and clutches. The problem of chatter is as much present in clutches as it is in brakes.

Unfortunately, the very friction materials which are more advantageous for their heat resistance (namely, those which have metallic binders and amounts of ceramic), are quite often prone to produce brake chatter. The state of the art is now at the point where the tendency toward brake chatter is probably the most serious shortcoming of the metallic-ceramic friction materials.

Referring to the drawing, Figure 1, it is a common practice to mount individual segments 10 of friction material at circumferentially spaced points, so that there is a discontinuance friction surface around the perimeter of annular stator plates 12. The stator has a number of splines 14 at its near periphery which permits it to move axially and thus bring the surfaces of segments 10 into engagement with the adjacent relatively rotatable rotor 16. The rotor 16 is driven by keys (not shown) which are received in slots 18 at the outer periphery of the rotor. The brake arrangement consists of alternating rotors and stators in the desired number to give the desired brake capacity. Usually, brake arrangements include two or three rotors and as many interleaved stators.

The problem of chatter does not become apparent (in the case of brakes) until relative slip velocity between the friction segment and its opposing surface is quite low, as for example when the aircraft is traveling ten miles per hour or less. At this stage, there is a tendency for the coefficient of friction of the friction material to increase, causing a sudden rise in brake effectiveness which is independent of the pilot's applying effort. This causes the brake to grab and release alternately at very short time intervals and thus produce chatter. The chatter frequency can attain a harmonic frequency with respect to the wheel and shock strut components and this has a destructive effect on both the shock strut and the wheel. It has been known to jar loose the entire instrument panel of the aircraft under severe chatter, when these harmonic frequencies have been reached.

Referring to the mounting shown in Figures 2–5, I propose a cushion mount which will enable a slight circumferential movement of the individual friction segments 10 with respect to the carrier or stator plate 12. For each pair of back-to-back friction segments 10 (referring to Figures 2, 3, 4 and 5), there is an opening 20 in the stator plate 12 which at its radially outermost and radially innermost portions has curved arcuate sidewall surfaces 22. Substantially straight sidewall surfaces 24 join these arcuate surfaces 22.

The friction segments 10 include a connecting member 26 which is received in the opening 20. This connecting member serves as the intermediate attachment between the friction segment 10 and the stator plate 12.

The connecting member 26 is a stamping having a central opening 28 which receives the two fastener buttons 30, one being provided for each friction segment. The connecting member 26 has two crescent shaped blanked portions 32. The blanked portions provide resilient deformable hoop-shaped ends or margins 34 which bear against the arcuate surfaces 22 of opening 20.

Each friction segment is made up of friction material 36 which is received in a container 38 and is held therein by the cup shaped walls 40 of the container. Bearing against the base of each container is a shoulder 42 of the fastener button 30. A reduced diameter portion 44 of the fastener button 30 is passed into the opening 28. A rivet 46 draws the two fastener buttons 30 together and thus clamps the containers 38 against the opposite sides of the stator 12.

At the base of the container is a nib 48 which is passed into an opening 50 in the stator 12 to prevent rotation of the segment. The opening 50 is oblong (see Figure 2) so that the friction segment can move circumferentially but not rotate.

During application of the brake (or clutch), the dragging force of engagement (which is represented by the arrows in Figure 1) tends to move the segment circumferentially. The resistance to circumferential movement is transmitted from the friction segment to the stator via connecting member 26. The connecting member 26 tends to move slightly within the oversize opening 24, as permitted by the margins 34 of yieldable material.

Under the most strenuous brake forces, the connecting member 26 can move no further than permitted by the clearance between side 24 of the opening 20 and the adjacent side of the connecting member. It has been found that this yieldable mounting of the friction segment, as contrasted with a rigid connection, tends to disrupt harmonic vibration within the brake by permitting the slight, relative movement between the friction segment and the stator plate 12. It is possible to provide different spring rates for the margin 34 with various friction segments; and, by varying the cushioning effect with respect to different segments, there is reduced any possibility of encountering a harmonic vibration which would be common to each of the friction segments and conceivably lead to the same problem of chatter as found with a rigid mounting. The nibs 48, received in oblong openings 50, allow the friction segment to move circumferentially but prevent both radial and rotational movement of the frictional segment.

Referring next to Figure 6 in this embodiment, the connecting member 26a is warped in shape and displaces the base of the containers 38 away from contact with the stator 12. Each friction segment is thus permitted to float in an axial direction to insure uniform engagement pressure against the opposing surface. The blanked-out portion 32 of the connecting member enables the friction segment to move slightly in a circumferential sense against the yieldable resistance of margin 34 just as in the previous embodiment.

The disclosed mounting arrangements are capable of withstanding "set" from braking temperatures as high as 1200° F. In other words, the construction proposed is suitable for high kinetic energy absorbing aircraft braking and is operative while encountering temperatures as high as 1200° F.

When relining the brakes, the entire friction segment is replaced and during that time it is proposed that a different connecting member 26 will be included so that even if it has been changed slightly under braking temperatures then it will be replaced along with the friction segments.

From an analysis of the various conditions occurring during brake application, it is theorized that the different cushion mountings for the friction segments causes the segments to "hunt" between static and dynamic coefficients of friction and that this has the net effect of reducing the amplitude of chatter and breaks up the frequency of the chatter by superimposing the various spring rates of the different cushion mountings.

While I have described the invention with specific reference to an inorganic friction composition, it is not to be assumed that the invention is limited to this material solely. The inorganic friction material has been selected because it has a greater tendency to increase in its coefficient of friction with decrease in speed and is thus more likely to chatter than the organic friction material; but, this invention is not restricted to any particular class of friction materials.

From the few selected embodiments of the invention above described, it will be obvious to those skilled in the art that numerous modifications and revisions can be made without departing from the underlying principles thereof. It is intended that such variations as incorporate the herein disclosed principles will be included within the terms of the following claims.

I claim:

1. In a friction producing device: first and second members movable in generally parallel planes with said first member being relatively movable forwardly over said second member in a first direction, there also being a second vertical direction extending normal to said planes, and a third lateral direction mutually perpendicular to said first and second directions, said second member having an opening therein whose center extends generally vertically, a first imaginary plane extending through said center in said first and second directions, a second imaginary plane passing through said opening and extending laterally in said second and third directions, said opening having front sidewall surfaces spaced forwardly of said second imaginary plane, said front sidewalls having a generally vertical portion extending rearwardly and laterally outwardly from said first imaginary plane, a friction producing member for slidably engaging and developing friction with respect to said first member, said friction producing member having a connecting portion positioned in said opening, said connecting portion having forward movement accommodating clearance between its forward edge and the front sidewalls of said opening, and having a yieldable portion which abuts said rearwardly and laterally extended portion of said front sidewalls of said opening and which yieldable portion is sprung laterally inwardly when said connecting portion of said friction producing member is moved forwardly in its opening, and guide means accommodating forward movement of said connecting portion in said opening but preventing lateral movement of said connecting portion in said opening, whereby lateral movement of said friction producing member relative to said first member is prevented and sudden frictional forces on said friction producing member are absorbed by the laterally inward deflection of said yieldable portion of said friction producing member.

2. In a friction producing device: first and second members movable in generally parallel planes with said first member being relatively movable forwardly over said second member in a first direction, there also being a second vertical direction extending normal to said planes, and a third lateral direction mutually perpendicular to said first and second directions, said second member having an opening therein whose center extends generally vertically, a first imaginary plane extending through said center in said first and second directions, said opening having a first sidewall portion extending generally laterally outwardly and rearwardly relative to said first imaginary plane and a second portion on the same side of said plane extending generally laterally inwardly and rearwardly relative to said first imaginary plane, a friction producing member for slidably engaging and developing friction with respect to said first member, said friction producing member having a connecting portion positioned in said opening, said connecting portion being movable forwardly and rearwardly in said opening, and having laterally inwardly yieldable portions which respectively abut said first and second sidewall portions of said opening, and guide means accommodating forward and rearward movement of said connecting portion in said opening but preventing lateral movement in said opening, whereby lateral movement of said friction producing member relative to said first member is prevented and sudden frictional forces on said friction producing member are absorbed by the laterally inward deflection of its yieldable portions.

3. In a friction producing device: first and second members movable in generally parallel planes with said first member being relatively movable forwardly over said second member in a first direction, there also being a second vertical direction extending normal to said planes, and a third lateral direction mutually perpendicular to said first and second directions, said second member having an opening therein whose center extends generally vertically, a first imaginary plane extending through said center in said first and second directions, said opening having a first sidewall portion extending generally laterally outwardly and rearwardly relative to said first imaginary plane and a second portion on the same side of said plane extending generally laterally inwardly and rearwardly relative to said first imaginary plane, a friction producing member for slidably engaging and developing friction with respect to said first member, said friction producing member having a connecting portion positioned in said opening, said connecting portion being movable forwardly and rearwardly in said opening, and having a laterally inwardly yieldable hoop-shaped portion which abuts said first and second sidewall portions of said opening, guide means accommodating forward and rearward movement of said connecting portion in said opening but preventing lateral movement in said opening, whereby lateral movement of said friction producing member relative to said first member is prevented and sudden frictional forces on said friction producing member are absorbed by the laterally inward deflection of its yieldable hoop-shaped portion.

4. In a friction producing device: first and second members movable in generally parallel planes with said first member being relatively movable forwardly over said second member in a first direction, there also being a second vertical direction extending normal to said planes, and a third lateral direction mutually perpendicular to said first and second directions, said second member having an opening therein whose center extends generally vertically, a first imaginary plane extending through said center in said first and second directions, said opening having a pair of first sidewall portions individual ones of which extend generally laterally outwardly and rearwardly on respective sides of said first imaginary plane and a pair of second portions individual ones of which extend generally laterally inwardly and rearwardly on respective sides of said first imaginary plane, a friction producing member for slidably engaging and developing friction with respect to said first member, said friction producing member having a connecting portion positioned in said opening, said connecting portion being movable forwardly and rearwardly in said opening, and having a pair of laterally inwardly yieldable hoop-shaped portions positioned on respective sides of said first imaginary plane and which respectively abut the ones of said pairs of said first and second sidewall portions lying on its side of said first imaginary plane, whereby sudden frictional forces on said friction producing member are absorbed by the laterally inward deflection of its yieldable hoop-shaped portions.

5. In a friction producing device: first and second members movable in generally parallel planes with said first member being relatively movable forwardly over said second member in a first direction, there also being a second vertical direction extending normal to said planes, and a third lateral direction mutually perpendicular to said first and second directions, said second member having an opening therein whose center extends generally vertically, a first imaginary plane extending through said center in said first and second directions, said opening having a pair of first sidewall portions individual ones of which extend generally laterally outwardly and rearwardly on respective sides of said first imaginary plane and a pair of second portions individual ones of which extend generally laterally inwardly and rearwardly on respective sides of said first imaginary plane, a friction producing member for slidably engaging and developing friction with respect to said first member, said friction producing member having a connecting portion positioned in said opening, said connecting portion being movable forwardly and rearwardly in said opening, and having a pair of laterally inwardly yieldable hoop-shaped portions positioned on respective sides of said first imaginary plane and which respectively abut the ones of said pairs of said first and second sidewall portions lying on its side of said imaginary plane, and guide means accommodating forward and rearward movement of said connecting member in said opening but preventing lateral movement in said opening, whereby lateral movement of said friction producing member relative to said first member is prevented and sudden frictional forces on said friction producing member are absorbed by the laterally inward deflection of its yieldable hoop-shaped portions.

6. In a friction producing device: a pair of first generally parallel members which are positioned normally to and extend about an axis of rotation, said members being spaced axially from each other, a second member positioned between said first members in a manner normal to and extending about said axis of rotation, said second member having an opening therethrough and there being a first imaginary generally radial plane passing through the imaginary center of said opening and said axis of rotation and dividing said opening into forward and rearward portions, and a second imaginary plane passing through said imaginary center of said opening normal to said first plane and dividing said opening into radially inner and radially outer portions, the radially inner portion having a pair of sidewall sections individual ones of which extend generally radially inwardly and toward said first radial plane, and said radially outer portion having a pair of sidewall sections individual ones of which extend generally radially outwardly and toward said first radial plane, a pair of friction producing members positioned back-to-back and attached together through said opening, said friction producing members having a plate-shaped connecting portion positioned in said opening, said connecting portion having radially inner and radially outer hoop-shaped ends each of which are normally centered in abutment with a respective pair of said radially inner and radially outer sidewall sections of said opening, and said connecting portion being movable normally to said generally radially extending plane through said opening except as prevented by deformation of said hoop-shaped ends of said connecting portion against said sidewall sections of said opening, whereby sudden increases in frictional forces transmitted by said friction producing members are yieldably transmitted to said second member through deformation of said hoop-shaped ends of said connecting portion.

7. In a friction producing device: a pair of first generally parallel members which are positioned normally to and extend about an axis of rotation, said members being spaced axially from each other, a second member positioned between said first members in a manner normal to and extending about said axis of rotation, said second member having an opening therethrough and there being a first imaginary generally radial plane passing through the imaginary center of said opening and said axis of rotation and dividing said opening into forward and rearward portions, and a second imaginary plane passing through said imaginary center of said opening normal to said first plane and dividing said opening into radially inner and radially outer portions, the radially inner portion having a pair of sidewall sections individual ones of which extend generally radially inwardly and toward said first radial plane, and said radially outer portion having a pair of sidewall sections individual ones of which extend generally radially outwardly and toward said first radial plane, a pair of friction producing members positioned back-to-back and attached together through said opening, said friction producing members having a plate-shaped connecting portion positioned in said opening, said connecting portion having radially inner and radially outer hoop-shaped ends each of which are normally centered in abutment with a respective pair of said radially inner and radially outer sidewall sections of said opening, and said connecting portion being movable normally to said generally radially extending plane through said opening except as prevented by deformation of said hoop-shaped ends of said connecting portion against said sidewall sections of said opening, and guide means accommodating movement of said friction producing members generally normally to said generally radially extending plane but preventing their radial and rotational movement relative to said second member, whereby sudden increases in frictional forces transmitted by said friction producing members are yieldably transmitted to said second member through deformation of said hoop-shaped ends of said connecting portion.

8. In a friction producing device: a pair of first generally parallel members which are positioned normally to and extend about an axis of rotation, said members being spaced axially from each other, a second member positioned between said first members in a manner normal to and extending about said axis of rotation, said second member having an opening therethrough and there being a first imaginary generally radial plane passing through the imaginary center of said opening and said axis of rotation and dividing said opening into forward and rearward portions, and a second imaginary plane passing through said imaginary center of said opening normal to said first plane and dividing said opening into radially inner and radially outer portions, the radially inner portion having a pair of sidewall sections individual ones of which extend generally radially inwardly and toward said first radial plane, and said radially outer portion having a pair of sidewall sections individual ones of which extend generally radially outwardly and toward said first radial plane, a pair of friction producing members positioned back-to-back and attached together through said opening by means which permit said friction producing members to be moved toward each other, said friction producing members having a plate-shaped connecting portion positioned in said opening, said connecting portion having radially inner and radially outer hoop-shaped ends each of which are normally centered in abutment with a respective pair of said radially inner and radially outer sidewall sections of said opening, and said connecting portion being movable normally to said generally radially extending plane through said opening except as prevented by deformation of said hoop-shaped ends of said connecting portion against said sidewall sections of said opening, said hoop-shaped ends being bent in axial directions to yieldably bias said friction producing members apart, and guide means accommodating movement of said friction producing members generally normally to said generally radially extending plane but preventing their radial and rotational movement relative to said second member, whereby sudden increases in frictional forces transmitted by said friction producing members are yieldably transmitted to said second member through deformation of said hoop-shaped ends of said connecting portion.

9. In a brake or clutch mounting of claim 6, a nib formed in the base of each of said friction producing members, and an oblong opening formed in said second member for receiving said nib whereby rotation of the friction producing member on said second member is effectively prevented.

10. An annular friction member of a brake and the like comprising: an annular support member having an axis of rotation and an opening therethrough spaced radially from said axis, said opening having generally symmetrical sidewalls spaced about an imaginary center, and there being an imaginary radial plane passing through said imaginary center, a friction producing member having friction producing surfaces on opposite sides of said support member and a connecting portion extending through said opening, said friction producing member being movable in said opening in a direction normal to said imaginary radial plane, and spring means restraining said movement in said opening normal to said imaginary radial plane.

References Cited in the file of this patent

UNITED STATES PATENTS

| | | |
|---|---|---|
| 1,931,065 | Drude | Oct. 17, 1933 |
| 2,014,362 | Tatter | Sept. 10, 1935 |
| 2,093,243 | Katcher | Sept. 14, 1937 |

FOREIGN PATENTS

| | | |
|---|---|---|
| 768,510 | Great Britain | Feb. 20, 1957 |